No. 866,987. PATENTED SEPT. 24, 1907.
H. TURNER.
ANIMAL TRAP.
APPLICATION FILED OCT. 30, 1906.
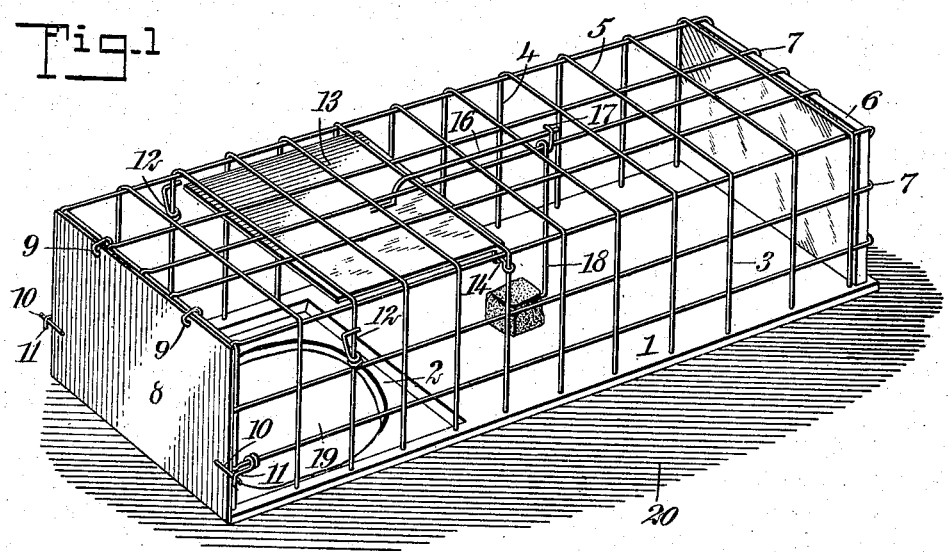
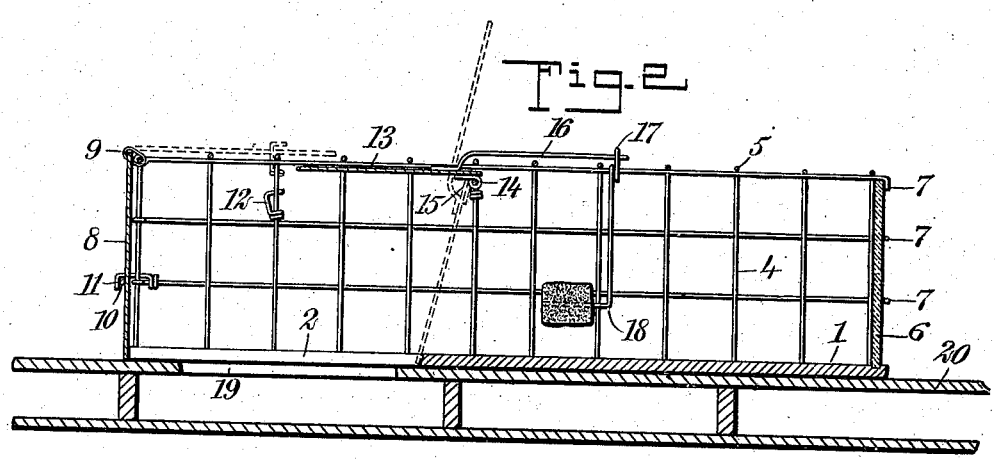
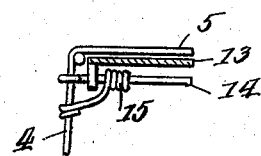
WITNESSES
J. A. Brophy
C. W. Fairbank
INVENTOR
Henry Turner
BY
Munn & Co
ATTORNEYS

UNITED STATES PATENT OFFICE.

HENRY TURNER, OF RICHMOND, VIRGINIA.

ANIMAL-TRAP.

No. 866,987.        Specification of Letters Patent.        Patented Sept. 24, 1907.

Application filed October 30, 1906. Serial No. 341,295.

*To all whom it may concern:*

Be it known that I, HENRY TURNER, a subject of the King of Great Britain, and a resident of Richmond, in the county of Henrico and State of Virginia, have invented a new and Improved Animal-Trap, of which the following is a full, clear, and exact description.

This invention relates to certain improvements in animal traps, and the object of the invention is to provide a device adapted to be placed over the hole in the floor or ground through which the animal customarily makes its entrance, and whereby the animal may be captured, or if not captured, prevented from entering the room. The device is likewise adapted to be placed against the wall and surround an opening therein in the same manner as when used in connection with a hole in the floor or ground.

Reference is to be had to the accompanying drawings forming a part of this specification, in which similar characters of reference indicate corresponding parts in both the figures, in which Figure 1 is a perspective view of the trap when set and placed over a hole in the floor; and Fig. 2 is a vertical longitudinal section of the trap and illustrating the manner of using the same. Fig. 3 is a sectional detail illustrating the supporting means for the partition.

The specific embodiment of my invention which I have illustrated in the drawings, comprises a body portion forming an inclosure and having the sides, top, and bottom made of any suitable material.

As illustrated, the bottom 1 is a rectangular board having an opening 2 adjacent one end thereof and supporting the wire mesh sides 3 and 4. The top 5 is also made of wire mesh and integral with the sides 3 and 4. One end 6 of the inclosure is formed of a single piece of glass held in place by the inturned ends 7 of the sides and top and supported within a groove in the bottom board 1. The opposite end 8 of the inclosure is hinged to the top by any suitable form of hinges 9, and its ends adjacent the lower edge are provided with projections 10 adapted to engage with movable hooks 11 carried by the sides, whereby the end member 8 may be locked in place. The hinge members 9 are such that the end 8 may be moved over into the position shown in dotted lines in Fig. 2, namely, in contact with the top of the cage, and may be here locked in place by suitable hooks 12 carried by the sides 3 and 4 of the inclosure adjacent the upper edges thereof.

Intermediate the ends of the trap and adjacent the edge of the opening 2, is a pivoted partition plate 13 adapted when lowered to divide the inclosure into two separate and distinct compartments. This partition may be supported upon a rod 14 below the top of the closure, said rod being provided with a coil spring 15 having one end thereof in engagement with the under side of the partition 13 and the opposite end thereof in engagement with one of the wires of the side of the inclosure, as clearly illustrated in Fig. 3, the spring normally tending to hold the partition in its lowered position. For holding the partition 13 in its raised or open position, I provide a rod 16 rigidly secured to the partition and extending through the top and for a considerable distance toward one end of the inclosure. Adjacent this end is a hook or trigger 17 carried by a bait-receiving hook 18 within the inclosure intermediate the hinged partition and the glass end.

In the employment of my improved device, the hinged partition 13 is raised to the position shown in solid lines in the drawings and the end of the rod 16 caught beneath the hook 17, as clearly indicated. The opening 2 in the bottom of the inclosure may then be placed directly over any opening 19 in the floor or the ground 20, and as the animal within the opening attempts to enter the room he is prevented from doing so but finds himself within the inclosure. He is then free to return the same way he came unless he should interfere with the bait upon the hook 18, in which case the partition 13 is liberated and caused to descend, leaving the animal in the compartment between this partition and the glass end. As the animal emerges from the hole 19 in the floor, he finds apparently but one means of escape and that is toward the glass end 6. In passing toward this end he may either liberate the partition 13 by attempting to remove the bait from the hook or by accidentally moving said hook when passing it on the way to the glass end. If he passes the hook and reaches the glass end without having sprung the trap, he is still liable to do so while wandering around attempting to escape into the room.

In case the opening through which the animal normally emerges is in a vertical wall, or in case it is designed to employ the trap within a room irrespective of any particular hole, the hinged end 8 is unhooked and moved to the position shown in dotted lines in Fig. 2. The animal may then freely enter the end of the trap to get to the bait; or the trap may be placed against a vertical wall, so that as the animal emerged from the opening in the wall, he finds himself entirely surrounded and must either spring the trap or return from whence he came.

The glass end 6 is normally invisible, and thus the animal normally passes directly to this end of the inclosure in his attempt to escape before the trap is sprung, thus passing adjacent the bait hook 18 and running the risk of springing the trap through contact of his body therewith.

Having thus described my invention, I claim as new and desire to secure by Letters Patent:

1. A trap, comprising an inclosure having a closed end and a bottom provided with an opening therein adapted to serve as the entrance to the trap, a movable partition located intermediate the closed end and the opening, means for holding said partition out of engagement with one wall of the inclosure and means within the closed end for releasing said partition.

2. A trap, comprising an inclosure having a closed end and a bottom provided with an opening therein adapted to serve as the entrance to the trap, a hinged partition located intermediate the closed end and the opening, means for holding said partition out of engagement with one wall of the inclosure and means within the closed end for releasing said partition.

3. A trap, comprising an inclosure having an opening in the bottom thereof adapted to serve as the entrance opening, a partition hinged adjacent the top thereof, means for normally holding said partition in engagement with said top, and means whereby the partition may be released and separate the inclosure into two separate compartments.

4. A trap, comprising an inclosure having an opening in the bottom thereof adapted to serve as the entrance opening, a partition adapted when released to prevent the return of a captive through said opening, a glass end for said inclosure, means for holding said partition in engagement with the top and means intermediate the partition and the glass end for releasing said partition.

5. A trap, comprising an inclosure having a hinged end, means for locking said end in its closed or open position, a partition intermediate the ends of said inclosure and adapted when closed to sub-divide the inclosure into two separate compartments, means for holding said partition in its open position, a glass end for said inclosure, and means intermediate the partition and said glass end for releasing said partition.

6. A trap, comprising an inclosure having an opening in the bottom thereof, a hinged end, means for locking said end in its closed position, means for locking said end in its open position, a glass end for said inclosure, a partition intermediate said ends, means for holding said partition adjacent the top of the inclosure, and means intermediate the partition and the glass end for releasing said partition, whereby it may separate the inclosure into two separate compartments.

7. A trap, comprising an inclosure having sides, a top, a closed end, and a bottom provided with an opening therein at a distance from said closed end, a movable partition adapted to prevent the return of a captive from the closed end through said opening when in its operative position, and means operatively connected to said movable partition and extending into the inclosure intermediate the partition and the closed end for permitting the partition to come into operative position.

8. A trap, comprising an inclosure having a closed end an opening in the bottom thereof adapted to serve as an entrance opening, a movable partition adapted to prevent the return of a captive from the closed end through said opening, and means operatively connected to said partition and adapted to be moved by the captive for permitting the partition to come into operative position.

9. A trap, comprising an inclosure having an open bottom adapted to serve as an entrance opening, a movable partition normally held in an inoperative position, and operating means operatively connected to said partition and adapted to be moved by the captive to permit the partition to come into operative position.

In testimony whereof I have signed my name to this specification in the presence of two subscribing witnesses.

HENRY TURNER.

Witnesses:
C. H. WILSON,
LOUISE LOVELACE.